United States Patent [19]

Nguyen

[11] Patent Number: 5,905,766
[45] Date of Patent: May 18, 1999

[54] SYNCHRONIZER, METHOD AND SYSTEM FOR TRANSFERRING DATA

[75] Inventor: Nhiem T. Nguyen, Cranberry, Pa.

[73] Assignee: FORE Systems, Inc., Warrendale, Pa.

[21] Appl. No.: 08/625,740

[22] Filed: Mar. 29, 1996

[51] Int. Cl.[6] .................................................. H04L 7/00
[52] U.S. Cl. ........................ 375/354; 375/355; 375/372; 327/144
[58] Field of Search ................................. 375/327, 355, 375/354, 371; 327/145, 161, 144, 141; 395/551, 552; 365/189.05, 189.01

[56] References Cited

U.S. PATENT DOCUMENTS

| 4,070,630 | 1/1978 | Hepworth et al. | 327/144 |
|---|---|---|---|
| 4,616,338 | 10/1986 | Helen et al. . | |
| 5,256,912 | 10/1993 | Rios | 327/144 |
| 5,280,584 | 1/1994 | Caesar et al. . | |
| 5,548,620 | 8/1996 | Rogers | 375/354 |
| 5,561,691 | 10/1996 | Weinraub | 375/355 |

FOREIGN PATENT DOCUMENTS

| 0643925 | 6/1992 | Australia | 375/354 |
|---|---|---|---|
| 0258062 | 8/1988 | European Pat. Off. . | |
| 0379279 | 7/1990 | European Pat. Off. | 375/354 |
| 0394599 | 10/1990 | European Pat. Off. . | |

*Primary Examiner*—Stephen Chin
*Assistant Examiner*—Betsy L. Deppe
*Attorney, Agent, or Firm*—Ansel M. Schwartz

[57] ABSTRACT

The present invention pertains to a synchronizer for transferring data from a first clock domain having a first clock signal at a first clock rate to a second clock domain having a second clock signal at a second clock rate different from the first clock domain. The synchronizer includes a mechanism for transferring data from the first clock domain to the second clock domain. Additionally, the synchronizer includes a mechanism for synchronizing the transfer of data from the first clock domain to the second clock domain by the transferring mechanism. The synchronizing mechanism is self-timing based only on the first clock rate and second clock rate without any additional control signals. The synchronizing mechanism is connected with the transferring mechanism. The present invention pertains to a system. The system includes a first clock domain having a first clock signal at a first rate. The system includes a second clock domain having a second clock signal at a second rate. The second clock domain is different than the first clock domain. Additionally the system is includes of a network on which data vectors travel. The network disposed and operating in the first clock domain. The system includes a memory mechanism for storing data vectors. The memory mechanism is disposed and operating in the second clock domain. The system includes a synchronizer, such as described above. The synchronizer is connected with the transferring mechanism. The present invention pertains to a method for transferring data from a first clock domain having a first clock signal at a first clock rate to a second clock domain having a second clock signal at a second clock rate different from the first clock domain.

29 Claims, 5 Drawing Sheets

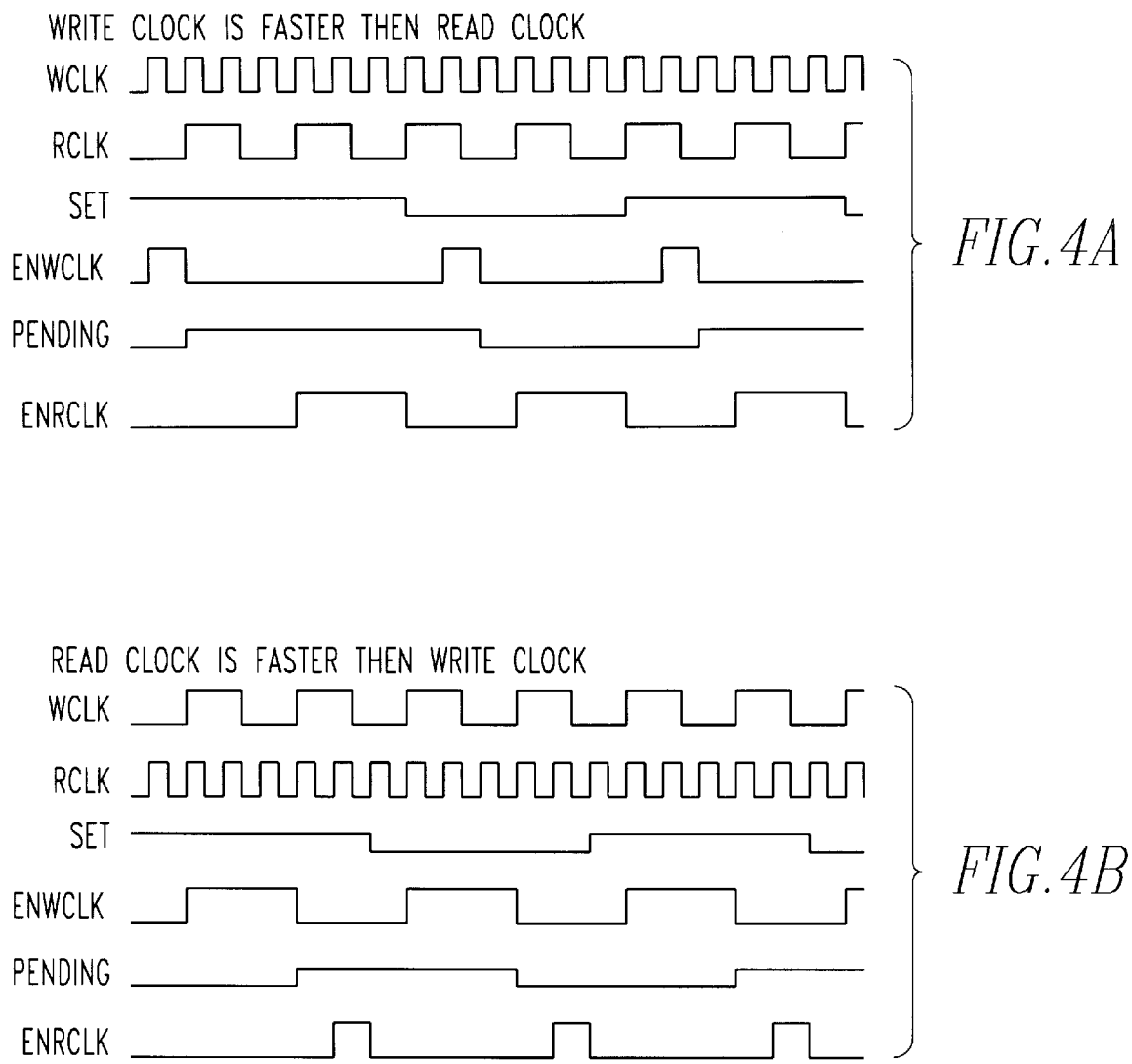

SYNCHRONIZER, METHOD AND SYSTEM FOR TRANSFERRING DATA

FIELD OF THE INVENTION

The present invention relates to a synchronizer. More specifically, the present invention relates to a data vector synchronizer which transfers data vectors from a first domain and a first clock rate to a second domain at a second clock rate for any frequency or phase relationship between the first clock rate and the second clock rate.

BACKGROUND OF THE INVENTION

In digital circuits, there are frequent needs to interface between asynchronous systems. Asynchronous systems operate at different clocks that have no frequency or phase relationship to one another. The common design method used to pass an asynchronous signal into a system is to sample that signal with a flip-flop running at the system clock. The signal after the flip-flop is synchronous to the system clock. The following are but a few of the many patents in this area. U.S. Pat. Nos. 3,976,949; 4,070,630; 4,873,703; 5,070,443; 5,099,140; 5,256,912; 5,291,529; 5,418,825; 5,487,092, all of which are incorporated by reference herein.

The difficulty arises when one tries to synchronize a set of signals, a data vector. Because of metastability, which can occur when the asynchronous signal transitions close to the system clock and thus violate the set up or hold time of the flip-flop, all the flip-flops that are synchronizing the data vector cannot be guaranteed to resolve, or settle, to the correct value at the same time. Thus, not all the data bits in the vector can be sampled correctly by the system clock and the data vector can have the wrong value.

Conventional technique of "double-clocking" using two flip-flops works only for one bit value. In an n-bit vector, not all the bits will settle out of metastable state at the same time to propagate synchronously to the system clock.

Using Gray coding technique to encode the data vector into Gray codes (only one bit can transition in one time period) requires extra circuitry for encoding and decoding. For large data vector the encoding and decoding can be large and can become a time critical path in the system. Also, this technique only works if the values of the data vector change in sequential order. If the data vector can change value arbitrarily Gray coding cannot insure a single bit transition.

Other esoteric designs rely on delay elements or special cells that are dependent on the silicon process and technology of the synchronization circuitry.

The data vector synchronizer described herein has the following features:

Synchronizes an n-bit data vector from one clock domain to another.

Assumes no relationship between the phase or frequency of the two clocks.

Insures data integrity with minimal lost in time.

Utilizes conventional synchronous digital logic with no delay or asynchronous elements.

Application

Moving data vectors in one clock domain to another. Especially suited for bus interface applications where one clock domain is totally asynchronous to another.

Synchronous FIFO buffering asynchronous data streams. Especially effective when used to synchronize the FIFO pointers across the clock domain to provide word counts or space counts inside the FIFO.

SUMMARY OF THE INVENTION

The present invention pertains to a synchronizer for transferring data from a first clock domain having a first clock signal at a first clock rate to a second clock domain having a second clock signal at a second clock rate different from the first clock domain. The synchronizer includes a mechanism for transferring data from the first clock domain to the second clock domain. Additionally, the synchronizer comprises a mechanism for synchronizing the transfer of data from the first clock domain to the second clock domain by the transferring mechanism. The synchronizing mechanism is self-timing based only on the first clock rate and second clock rate without any additional control signals. The synchronizing mechanism is connected with the transferring mechanism.

The present invention pertains to a system. The system comprises a first clock domain having a first clock signal at a first rate. The system comprises a second clock domain having a second clock signal at a second rate. The second clock domain is different than the first clock domain. Additionally the system is comprised of a network on which data vectors travel. The network disposed and operating in the first clock domain. The system comprises a memory mechanism for storing data vectors. The memory mechanism is disposed and operating in the second clock domain. The system comprises a synchronizer, such as described above. The synchronizer is connected with the transferring mechanism.

The present invention pertains to a method for transferring data from a first clock domain having a first clock signal at a first clock rate to a second clock domain having a second clock signal at a second clock rate different from the first clock domain. The method comprises the steps of receiving data at a first clock rate. Then, there is the step of providing the data in holding registers at a first clock rate. Next, there is the step of synchronizing the data in the holding registers at the first clock rate with sampling registers at a second clock rate based only on the first clock rate and the second clock rate without any additional control signals. Next, there is the step of transferring the data from the holding registers at the first clock rate to the sampling registers at the second clock rate. Then, there is the step of reading the data in the sampling registers at the second clock rate.

BRIEF DESCRIPTION OF THE DRAWINGS

In the accompanying drawings, the preferred embodiment of the invention and preferred methods of practicing the invention are illustrated in which:

FIGS. 4a and 4b show the timing diagrams of the clock sync circuit in operation with the two clock domains varying in frequencies.

DESCRIPTION OF THE PREFERRED EMBODIMENT

Figure 1:
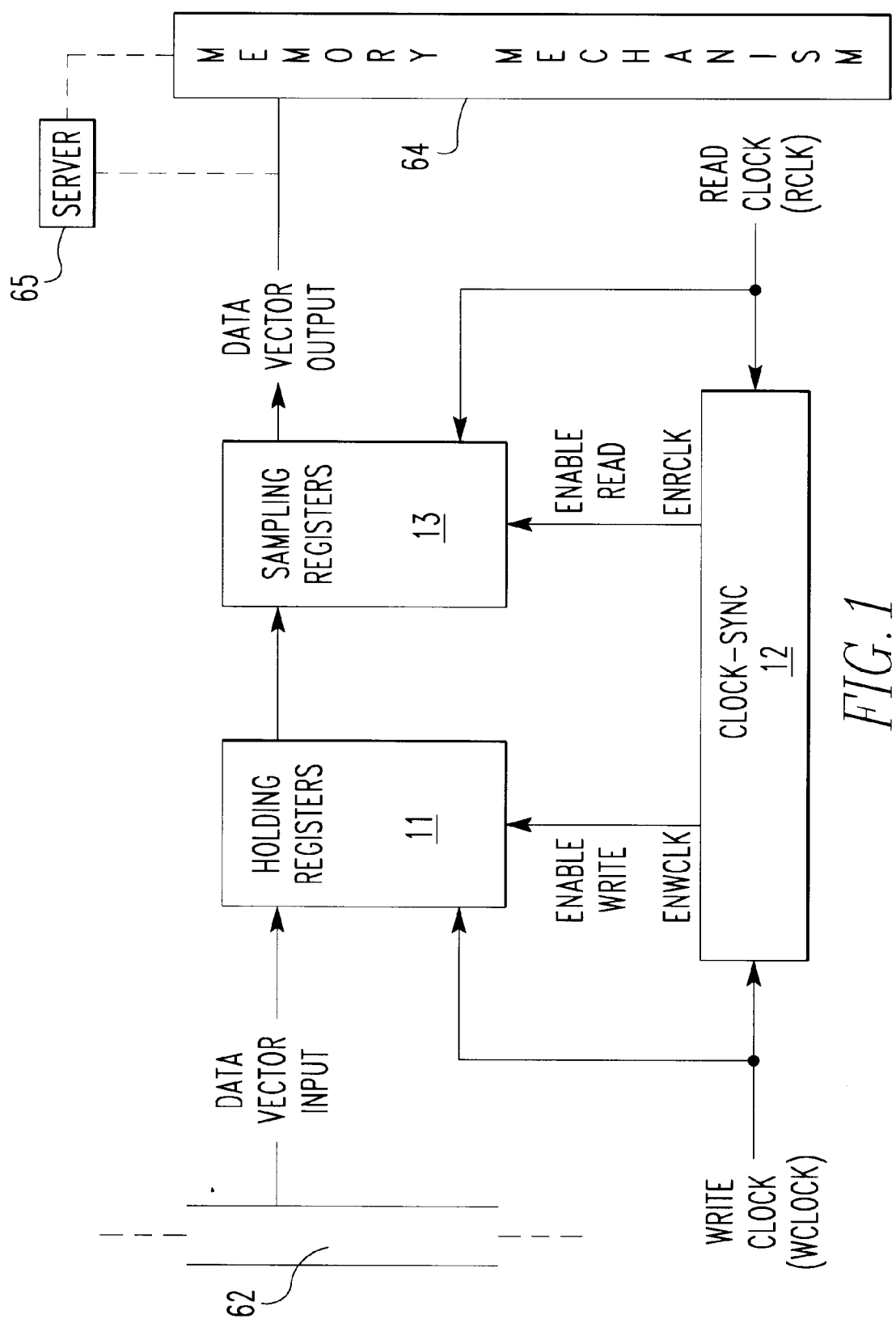
FIG. 1 depicts the major components of the synchronizer of the present invention.
Figure 2:
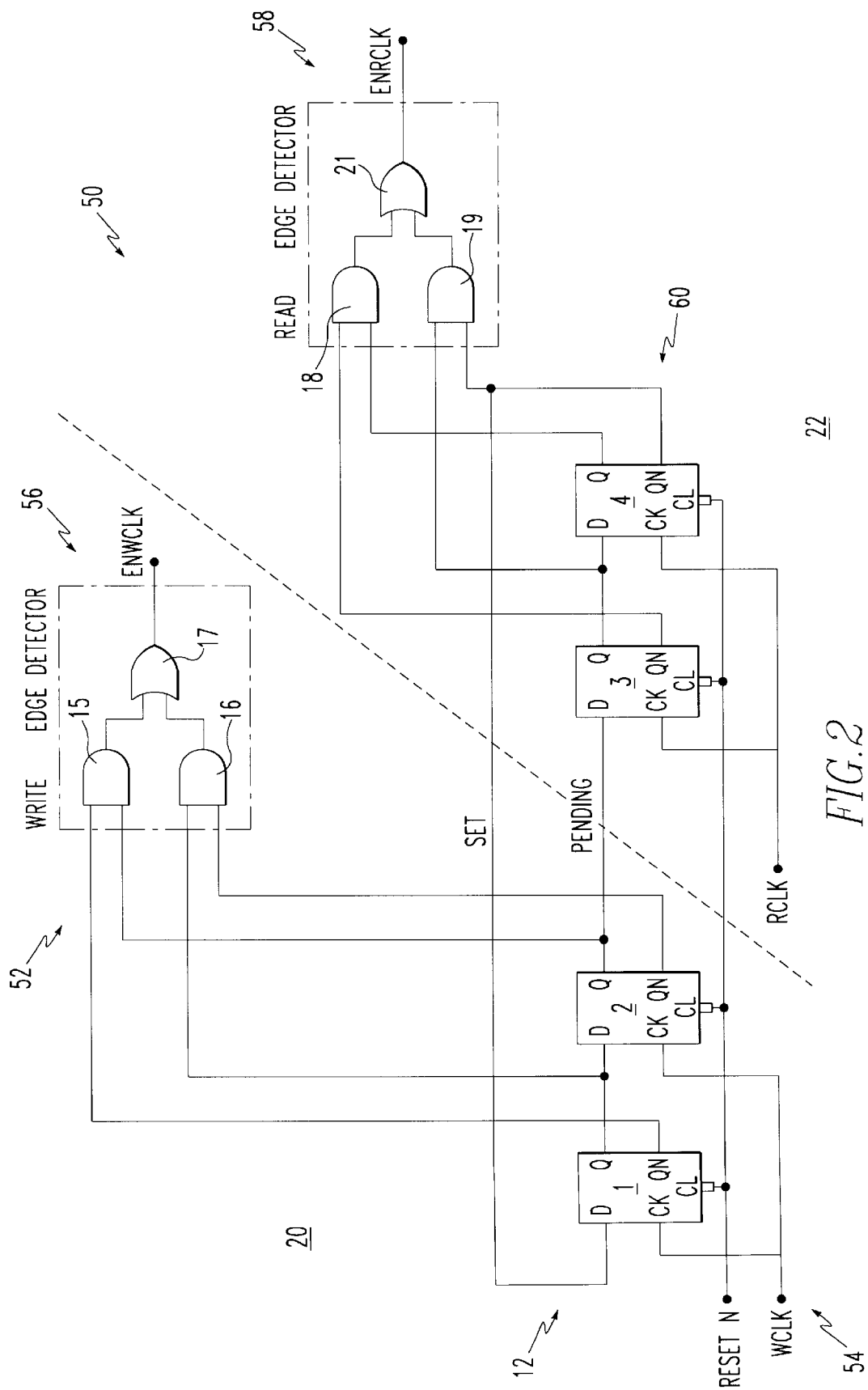
FIG. 2 shows the logic diagram of the clock sync circuit.

Referring now to the drawings wherein like reference numerals refer to similar or identical parts throughout the several views, and more specifically to FIGS. 1 and 2 thereof, there is shown a synchronizer 50 for transferring data from a first clock domain 20 having a first clock signal at a first clock rate to a second clock domain 22 having a second clock signal at a second clock rate different from the first clock domain 20. The synchronizer 50 comprises a mechanism 52 for transferring data from the first clock domain 20 to the second clock domain 22. Additionally, the synchronizer 50 comprises a mechanism 54 for synchronizing the transfer of data from the first clock domain 20 to the second clock domain 22 by the transferring mechanism 52. The synchronizing mechanism 54 is self-timing based only on the first clock rate and second clock rate without any additional control signals. The synchronizing mechanism 54 is connected with the transferring mechanism 52.

The transferring mechanism 52 preferably transfers N data vectors from the first clock domain 20 to the second clock domain 22, where N is greater than or equal to one and is an integer. The transferring mechanism 52 preferably transfers the N data vectors from the first clock domain 20 to the second clock domain 22 essentially all N data vectors at once.

Preferably, the transferring mechanism 52 is comprised of holding registers 11 in which the N data vectors are written. The holding registers 11 operate at the first clock rate in the first clock domain 20. The holding registers 11 are connected with the synchronizing mechanism 54. The transferring mechanism 52 preferably also is comprised of sampling registers 13 which receive the N data vectors and from which the N data vectors are read at the second clock rate in the second clock domain 22. The sampling registers 13 are connected with the synchronizing mechanism 54 in the holding registers 11. The holding registers 11 preferably include N holding registers 11 elements. There is one holding register element for each of the N data vectors. Furthermore, the sampling registers 13 include N sampling register elements. There is one sampling register element for each of the N data vectors.

The synchronizing mechanism 54 preferably includes a clock sync circuit 12 which is self-timing and produces an enable write signal which controls the holding registers 11 and writing of the N data vectors in the holding registers 11. The clock sync circuit 12 also produces an enable read signal which controls the sampling registers 13 and transfer of the N data vectors from the holding registers 11 to the sampling registers 13 and reading of the N data vectors in the sampling registers 13. Preferably, the clock sync circuit 12 has a write clock signal input for receiving the first clock signal of the first clock domain 20. The clock sync circuit 12 preferably also has a read clock signal input for receiving the second clock signal of the second clock domain 22. The clock control sync circuit preferably produces the enable write signal and enable read signal such that the sampling registers 13 only receive the N data vectors from the holding registers 11 when the N data vectors in the holding registers 11 are not changing for any frequency and or any phase relationship between the first clock rate and the second clock rate.

The clock sync circuit 12 preferably comprises a closed-loop shift register 60 for controlling the enable read signal and the enable write signal. The closed-loop shift register 60 is connected with the write clock signal input and the read clock signal input. The clock sync circuit 12 preferably comprises a write edge detector 56 which produces the enable write signal. The write edge detector 56 is connected to the closed loop shift register and to the N holding register elements. Additionally the clock sync circuit 12 preferably comprises a read edge detector 58 which produces the enable read signal. The read edge detector 58 is connected to the N sampling register elements and the closed loop shift register.

The closed-loop shift register 60 is preferably comprised of a first D flip-flop 1 connected to the write clock signal input and the write edge detector 56. Additionally, the closed-loop shift register 60 is preferably comprised of a second D flip-flop 2 connected to the first D flip-flop 1, the write clock signal input and the write edge detector 56. The closed-loop shift register 60 preferably is comprised of a third D flip-flop 3 connected to the second D flip-flop 2, the read clock signal input and the read edge detector 58. Also, the closed-loop shift register 60 is preferably comprised of a fourth D flip-flop 4 connected to the third D flip-flop 3, the first D flip-flop 1, the read clock signal input and the read edge detector 58.

The write edge detector 56 is preferably comprised of a first write AND 15 gate connected to the first D flip-flop 1 and the second D flip-flop 2. Additionally, the write edge detector 56 is preferably comprised of a second write AND 16 gate connected to be first D flip-flop 1 and the second D flip-flop 2. Also, the write edge detector 56 is preferably comprised of a write OR 17 gate connected to the first and second write AND 16 gate and the holding register elements. The read edge detector 58 is preferably comprised of a first read AND 18 gate connected to the third D flip-flop 3 and the fourth D flip-flop 4. Additionally, the read edge detector 58 is comprised of a second read AND 19 gate connected to the third D flip-flop 3 and the fourth D flip-flop 4. Also, the read edge detector 58 is preferably comprised of a read OR 21 gate connected to the first and second read OR 21 gate and the sampling register elements.

Figure 5:
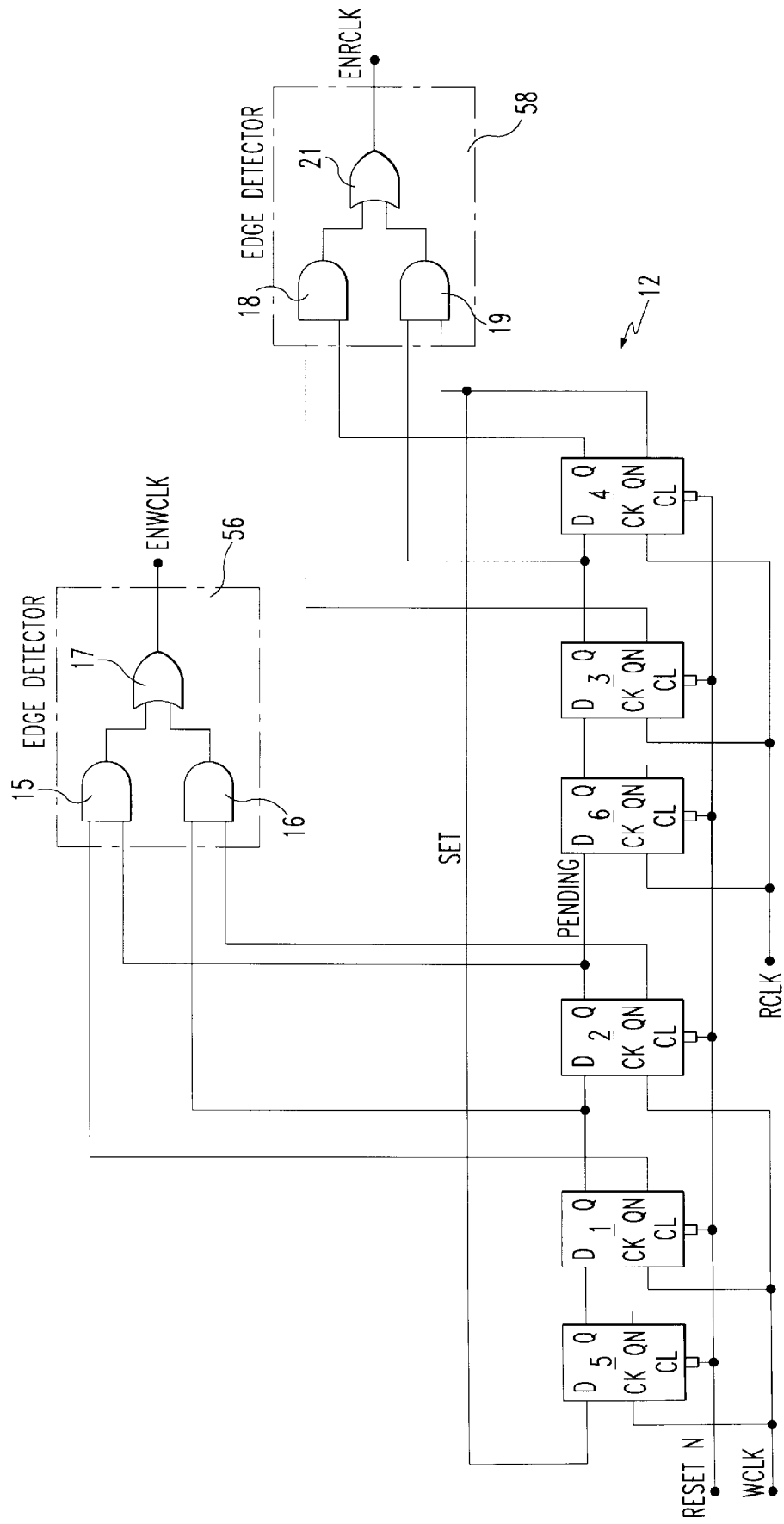
FIG. 5 shows a variation of the clock sync circuit with improve resistance to metastability.

Alternatively, as shown in FIG. 5, the closed-loop shift register 60 is comprised of a first D flip-flop 1 connected to the write clock signal input and the write edge detector 56. The closed-loop shift register 60 is comprised of a second D flip-flop 2 connected to the first D flip-flop 1, the write clock signal input and the write edge detector 56. Additionally, the closed-loop shift register 60 is comprised of a third D flip-flop 3 connected to the second D flip-flop 2, the read clock signal input and the read edge detector 58. The closed-loop shift register 60 is comprised of a fourth D flip-flop 4 connected to the third D flip-flop 3, the read clock signal input and the read edge detector 58. There is a fifth D flip-flop 5 connected to the write clock signal input, the fourth D flip-flop 4, and the first D flip-flop 1. Additionally, the closed-loop shift register 60 is comprised of a sixth D flip-flop 6 connected to the second D flip-flop 2, the third D flip-flop 3, and the read clock signal input.

The present invention pertains to a system 100, as shown in FIGS. 1 and 2. The system 100 comprises a first clock domain 20 having a first clock signal at a first rate. The system comprises a second clock domain 22 having a second clock signal at a second rate. The second clock domain 22 is different than the first clock domain 20. Additionally the system is comprised of a network 62 on which data vectors travel. The network 62 is disposed and operating in the first clock domain 20. The system comprises a memory mechanism 64 for storing data vectors. The memory mechanism 64 is disposed and operating in the second clock domain 22. The system comprises a synchronizer 50 for transferring data from a first clock domain 20 having a first clock signal at a first clock rate to a second clock domain 22 having a second clock signal at a second clock rate different from the first clock domain 20. The synchronizer 50 comprises a mechanism 52 for transferring data from the first clock domain 20 to the second clock domain 22. Additionally, the synchronizer 50 comprises a mechanism 54 for synchronizing the transfer of data from the first clock domain 20 to the second clock domain 22 by the transferring mechanism 52. The synchronizing mechanism 54 is self-timing based only on the first clock rate and second clock rate without any additional control signals. The synchronizing mechanism 54 is connected with the transferring mechanism 52. Once the data vectors are transferred to the second clock domain 22, they can be placed in the memory mechanism 64, as is well known. From the memory mechanism 64 they can, for instance, be provided to a server 65 for service by a scheduler of the server 65, as is well known in the art. Alternatively, the data vectors can be provided directly to the server.

The present invention pertains to a method for transferring data from a first clock domain 20 having a first clock signal at a first clock rate to a second clock domain 22 having a second clock signal at a second clock rate different from the first clock domain 20. The method comprises the steps of receiving data at a first clock rate. Then, there is the step of providing the data in holding registers 11 at a first clock rate. Next, there is the step of synchronizing the data in the holding registers 11 at the first clock rate with sampling registers 13 at a second clock rate based only on the first clock rate and the second clock rate without any additional control signals. Next, there is the step of transferring the data from the holding registers 11 at the first clock rate to the sampling registers 13 at the second clock rate. Then, there is the step of reading the data in the sampling registers 13 at the second clock rate.

Preferably, the data includes N data vectors and the holding registers 11 include N holding register elements. Each one of the N holding register elements hold one of the N data vectors. The synchronizing step preferably includes the steps of producing an enable write signal, and transmitting the enable write signal to the N holding register elements. The transferring step preferably includes the step of transferring the N data vectors to the sampling registers 13 essentially all at once.

In the operation of the preferred embodiment, the synchronizer consists of three main components: holding registers 11, clock sync circuit 12, and sampling registers 13. A data vector is a group of related signals, ranging from 1 to N signals. The "Write Clock" (wclk) signal is a clock signal that is synchronous to the input data vector. The output data vector is the same as the input data vector except that it is synchronous to the "Read Clock" (rclk) clock signals. Input data vector changes in the first or wclk clock domain 20 and output data vector is read out in the second or rclk domain 22. The clock sync circuit 12, shown in detail in FIG. 2, is a self-timed control circuit that generates the two control signals: "Enable-Write" (enwclk) and "Enable Read" (enrclk). Holding registers 11 and Sample Registers 13 are common digital register elements. A digital register captures an input value and presents that signal at the output at the transition of a clock signal, usually from 0 to 1, when an enable signal is active. If the clock transitions but the enable signal is not active, then the output of the register retains its previous value. Holding registers 11 consists of N register elements, one for each data input signal. The wclk is the common clock to all register elements in holding registers 11. The enwclk signal is the common enable signal to all register elements in holding registers 11. Similarly, sampling register 13 is made up of N register elements, one for each data output signal. The rclk is the common clock to all register elements in sampling registers 13. The enrclk signal is the common enable signal to all register elements in sampling registers 13.

The clock sync circuit 12 activates the enwclk signal synchronously to the wclk signal to command the holding registers 11 to capture the data vector input. All N signals that makes up the input data vector are logged into the holding registers 11 simultaneously at the 0 to 1 transition of the wclk signal when the enwclk signal is active. The clock sync control circuit 12 then deactivates the enwclk signal. Further changes in the data vector input does not affect the content of the holding registers 11. The output of the holding registers 11 is connected directly to the input of the sampling registers 13. After deactivating the enwclk signal, the clock sync circuit activates the enrclk signal synchronously to the rclk. The active enrclk signal causes the sampling registers 13 to capture the content of all N signals that makes up the data vector which is the output of holding registers 11 simultaneously at the 0 to 1 transition of the rclk signal. The clock sync circuit 12 then deactivates the enrclk signal causing the sampling registers 13 to retain its value regardless of further changes at its input. The output of the sampling registers 13 is now synchronously locked to the rclk clock domain.

The clock sync circuit 12 repeatedly activates the enwclk signal, then deactivates the enwclk signal, then activates the enrclk signal, and deactivates the enrclk signal. This self-timed operation continuously synchronizes input data vector from the wclk clock domain 20 to the output data vector in the rclk clock domain 22 without any additional control signals. There is no time when the clock sync circuit 12 has both enwclk signal and enrclk signal activated at the same time (non-overlapping). Consequently, the sampling registers 13 never captures its input data vector when that data is being changed by the holding registers 11, thus insuring the integrity between the data vector input and the data vector output.

The clock sync circuit 12 can generate the non-overlapping control signals enwclk and enrclk given any frequency or phase relationship between the wclk clock domain 20 and rclk clock domain 22. As shown in FIG. 2, the clock sync circuit 12 is made up of common digital logic elements: 2-input AND gates, 2-input OR gates, and "D" Flip-flops with reset (CL) and complimentary outputs (Q and QN). Flip-flop 1 through flip-flop 4 are connected to form a closed-loop shift register 60. The Q output of flip-flop 1 is connected to the D input of flip-flop 2. The Q output of the flip-flop 2 is connected to the D input of flip-flop 3. The Q output of flip-flop 3 is connected to the D input of flip-flop 4. The QN output of flip-flop 4 is connected back to the D input of flip-flop 1. The clock signal wclk is connected to the clock (CK) input of flip-flop 1 and flip-flop 2. The clock signal rclk is connected to the clock (CK) input of flip-flop 1 and flip-flop 2. The clock signal rclk is connected to the clock (CK) input of flip-flop 3 and flip-flop 4. The output AND gate 15 and the output of AND gate 16 are connected to the two inputs of OR gate 17. One input of AND gate 15 is connected to the QN output of flip-flop 1. The other input of AND gate 15 is connected to the Q output of flip-flop 2. One input of AND gate 16 is connected to the QN output of flip-flop 2. The other input of AND gate 16 is connected to the Q output of flip-flop 1. The output AND gate 18 and the output of AND gate 19 are connected to the two inputs of OR gate 21. One input of AND gate 18 is connected to the Q output of flip-flop 4. One input of AND gate 19 is connected to the QN output of flip-flop 4. The other input of AND gate 19 is connected to the Q output of flip-flop 3. The output of the OR gate 17 is connected to the signal enwclk. The output of the OR gate 21 is connected to the signal enrclk. A reset signal (reset_n) is connected to reset input (CL) of all the flip-flops.

The purpose of the reset signal is to set the outputs of the flip-flops to a known logic value after power is applied to the Control Sync circuit 12. During normal operation the reset input is not active and does not affect the operation of the clock sync circuit 12. The purpose of the AND gate 15, AND gate 16, and OR gate 17 is to generate the enwclk signal when there is a transition in signal going from flip-flip 1 to flip-flop 2. For example, the output of the AND gate 15 becomes a 1 (active), thus the output of the OR gate 17—signal enwclk—becomes active, when the output Q of flip-flop 2 is a 1 and the output QN of flip-flop 1 is a 1. Similarly, the output of the AND gate 16 becomes a 1 (active), thus the output of the OR gate 17—signal enwclk—becomes active, when the output QN of flip-flop 2 is a 1 and the output Q of flip-flop 1 is a 1. In effect, the AND gate 15, AND gate 16, and OR gate 17 detect and transition from 1 to 0 and transition from 0 to 1 of the signal passing from flip-flop 1 to flip-flop 2 and activate the nwclk signal. Similarly, the AND gate 18, AND gate 19, and OR ate 21 detect and transition from 1 to 0 and transition time from 0 to 1 of the signal passing from flip-flop 3 to flip-flop 4 and activate the enrclk signal.

Initially, after reset is briefly activated after the power up, all the Q outputs of all the flip-flops are at logic 0, and all the outputs QN of all the flip-flops are at logic 1. The set signal, which is connected to the QN of flip-flop 4, is at logic 1. The enwclk signal and enrclk signal are both in an inactive state (logic 0). The clock sync circuit 12 stays in this state until an active wclk clock arrives. An active clock edge on the clock signal wclk clocks a logic 1 to the Q output of flip-flop 1. At the same time, the QN output of flip-flop 1 goes to logic 0. Since the QN output of flip-flop 2 was at logic 1, this signal transition through flip-flop 1 activates the enwclk signal. The next active clock edge on the clock signal wclk propagates the logic 1 from output Q for flip-flop 1 to the output Q of flip-flop 2. The pending signal is now active. At the same time, the enwclk signal is deactivated because there is no signal transition through flip-flop 1; the signal set is still at logic 1, so the output Q of flip-flop 1 remains at logic 1. An active clock edge on the clock signal rclk brings the output Q of flip-flop 3 to a logic 1. This transition of signal through the flip-flop 3 causes the enrclk signal to be activated. Note that any subsequent active clock edge from wclk does not change the state of the clock sync circuit 12 at this time, since the set signal remains at logic 1, thus the pending signal also stays at logic 1, and the enwclk signal is held inactive. The next active edge on the rclk signal propagates logic 1 to the Q output and logic 0 to the QN output of flip-flop 4. Since there is no transition at the Q output of flip-flop 3; the pending signal is still at logic 1, and the enrclk signal is deactivated. The set signal is now at logic 0 (QN output of flip-flop 4 is at logic 0). The next active edge on the wclk clock signal turns the output Q of flip-flop 1 to logic 0. Since this is a transition from the previous value, the enwclk signal is activated. The next active clock edge on the rclk signal propagates the logic 0 to the Q output of flip-flop 4 and deactivates the enrclk signal. The set signal is now back to logic 1 and complete sequence repeats. The circuit is self-timed in the sense that it is free running with no external control signal other than the two clocks from the two domains.

The enwclk signal and the enrclk signal are alternatively activated, but never at the same time (non-overlapping). This non-overlapping characteristic can be seen by observing that the enwclk is in the wclk domain and is only active for one wclk period at a time. Similarly, the enrclk is in the rclk domain and is active for one rclk clock period at a time.

When the enwclk signal is active, the next wclk clock cycle will deactivate it. This next wclk cycle will also change the state of the pending signal which, in turn, is propagated through flip-flop 3 by the rclk clock signal and activates the enrclk signal. The activation of the enrclk signal always follows the deactivation of the enwclk signal.

The clock sync circuit 12 achieves its efficiency by isolating the potential metastability point to the two internal control signals: set and pending. only these two internal control signals are actually synchronized from one clock domain to another. Regardless of the size of the data vector (N could be as large as necessary), only one clock sync circuit 12 is used and inside it there are only two points of synchronization.

The clock sync circuit 12 depicted in FIG. 5 can be used to maximize metastability resistance and reliability of the synchronization. This clock sync circuit 12 is identical to the clock sync circuit 12 discussed in FIG. 2 with the addition of two more flip-flops: flip-flop 5 and flip-flop 6. Flip-flop 5 provides an extra stage, and thus additional time to resolve metastability, to synchronize the control signal set from the rclk clock domain to the wclk clock domain. Similarly, flip-flop 6 provides the extra synchronization stage for the control signal pending to go from the wclk domain to the rclk domain.

Figure 3A:
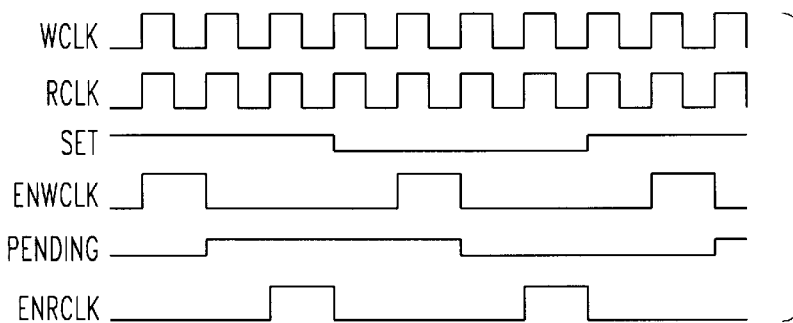
FIGS. 3a, 3b, 3c and 3d show the timing diagrams of the clock sync circuit in operation with the two clock domains varying in phases.

FIG. 3A shows the wave form of the signals in the synchronizer when the two clock domains have the same frequency and phase (WCLK and RCLK).

Figure 3B:
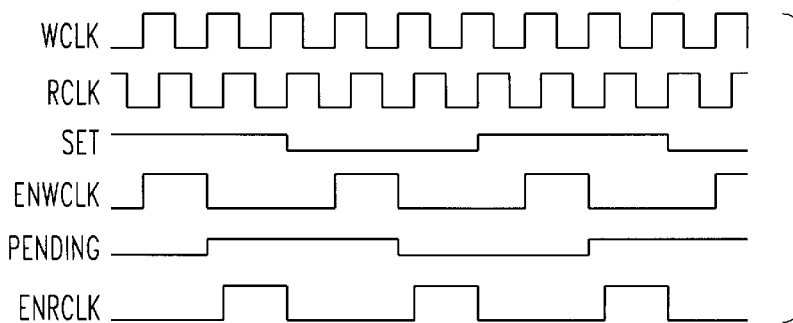

FIG. 3B shows the wave form of the signals in the synchronizer when the two clock domains have the same frequency but the WCLK clock leads the RCLK clock in phase.

Figure 3C:
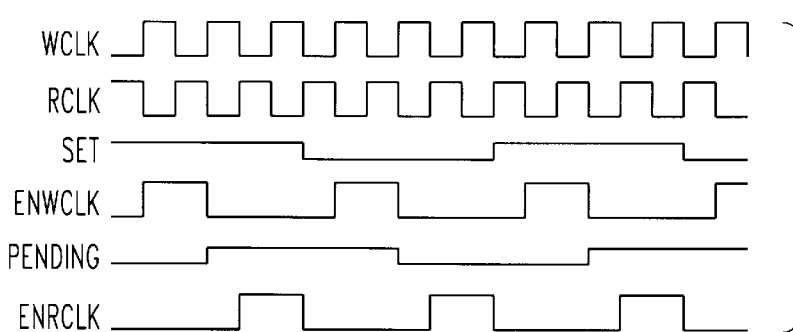

FIG. 3C shows the wave form of the signals in the synchronizer when the two clock domains have the same frequency but the WCLK clock and RCLK clock have opposite phase.

Figure 3D:
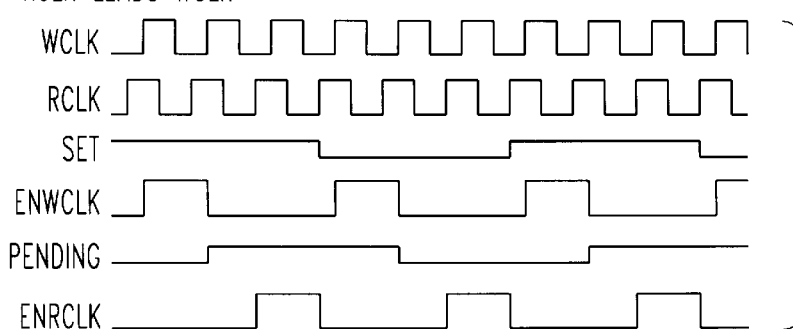

FIG. 3D shows the wave form of the signals in the synchronizer when the two clock domains have the same frequency but the RCLK clock leads the WCLK clock in phase.

FIG. 4A shows the wave form of the signals in the synchronizer when WCLK clock has higher frequency than the RCLK clock.

FIG. 4B shows the wave form of the signals in the synchronizer when WCLK clock has lower frequency than the RCLK clock.

For instance, the network 62 can be an ATM network, and the server or memory mechanism can be on a chip. For a complete discussion of ATM and how the synchronizer 50 can be used therein. See, for instance, "Gigabit Networking" by Craig Partridge, Addison Wesley, 1994; "ATM User Network Interface Specification, Version 3.0" by the ATM Forum, Prentice Hall, 1994; "Asynchronous Transfer Mode Networks: Performance Issues", by Raif O. Onvural, Artech House, Inc., Norwood, Mass. 1994, all of which are incorporated by reference. More specifically, the synchronizer 50 can be used to synchronize the pointer for a data FIFO (memory mechanism) in an ATM context. Alternatively, the transferring mechanism and the synchronizing mechanism can be transferring means or synchronizing means.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A synchronizer for transferring data from a first clock domain having a first clock signal having leading edges at a first clock rate to a second clock domain having a second clock signal having leading edges at a second clock rate different from the first clock domain comprising:

a mechanism for transferring data from the first clock domain to the second clock domain; and a mechanism for synchronizing the transfer of data from the first clock domain to the second clock domain by the transferring mechanism, said synchronizing mechanism self-timing based only on the leading edges of the first clock rate and leading edges of the second clock rate without any additional control signals and at any frequency relationship between the first clock rate and second clock rate, said synchronizing mechanism connected with said transferring mechanism.

2. A synchronizer as described in claim 1 wherein said transferring mechanism transfers N data vectors from the first clock domain to the second clock domain, where N is greater than or equal to 1 and is an integer.

3. A synchronizer as described in claim 2 wherein said transferring mechanism transfers the N data vectors from the first clock domain to the second clock domain all N data vectors at once.

4. A synchronizer as described in claim 3 wherein said transferring mechanism is comprised of holding registers in which the N data vectors are written, said holding registers operating at the first clock rate in the first clock domain, said holding registers connected with the synchronizing mechanism; and sampling registers which receive the N data vectors and from which the N data vectors are read at the second clock rate in the second clock domain, said sampling registers connected with the synchronizing mechanism and the holding registers.

5. A synchronizer as described in claim 4 wherein the synchronizing mechanism includes a clock sync circuit which is self timing and produces an enable write signal which controls the holding registers and writing of the N data vectors in the holding registers; and an said clock sync circuit produces enable read signal which controls the sampling registers and transfer of the N data vectors from the holding registers to the sampling registers and reading of the N data vectors in the sampling registers.

6. A synchronizer as described in claim 5 wherein the holding registers include N holding register elements, one holding register element for each of the N data vectors, and wherein the sampling registers include N sampling register elements, one sampling register element for each of the N data vectors.

7. A synchronizer as described in claim 6 wherein the clock sync circuit has a write clock signal input for receiving the first clock signal of the first clock domain, and a read clock signal input for receiving the second clock signal of the second clock domain.

8. A synchronizer as described in claim 7 wherein the clock sync circuit produces the enable write signal and enable read signal such that the sampling registers only receive the N data vectors from the holding registers when the N data vectors in the holding registers are not changing for any frequency and for any phase relationship between the first clock rate and the second clock rate.

9. A synchronizer as described in claim 8 wherein the clock sync circuit comprises a closed-loop shift register for controlling the enable read signal and the enable write signal, said closed-loop shift register connected with the write clock signal input and the read clock signal input; a write edge detector which produces the enable write signal, said write edge detector connected to the closed loop shift register and to the N holding register elements; and a read edge detector which produces the enable read signal, said read edge detector connected to the N sampling register elements and the closed loop shift register.

10. A synchronizer as described in claim 9 wherein the closed-loop shift register is comprised of a first D flip-flop connected to the write clock signal input and the write edge detector; a second D flip-flop connected to the first D flip-flop, the write clock signal input and the write edge detector; a third D flip-flop connected to the second D flip-flop, the read clock signal input and the read edge detector; and a fourth D flip-flop connected to the third D flip-flop, the first D flip-flop, the read clock signal input and the read edge detector.

11. A synchronizer as described in claim 10 wherein the write edge detector is comprised of a first write AND gate connected to the first D flip-flop and the second D flip-flop, a second write AND gate connected to the first D flip-flop and the second D flip-flop; and a write OR gate connected to the first and second write AND gate and the holding register elements.

12. A synchronizer as described in claim 11 wherein the read edge detector is comprised of a first read AND gate connected to the third D flip-flop and the fourth D flip-flop; a second read AND gate connected to the third D flip-flop and the fourth D flip-flop, and a read OR gate connected to the first and second read AND gate and the sampling register elements.

13. A synchronizer as described in claim 9 wherein the closed-loop shift register is comprised of a first D flip-flop connected to the write clock signal input and the write edge detector; a second D flip-flop connected to the first D flip-flop, the write clock signal input and the write edge detector; a third D flip-flop connected to the second D flip-flop, the read clock signal input and the read edge detector; a fourth D flip-flop connected to the third D flip-flop, the read clock signal input and the read edge detector; a fifth D flip-flop connected to the write clock signal input, the fourth D flip-flop, and the first D flip-flop; and a sixth D flip-flop connected to the second D flip-flop, the third D flip-flop, and the read clock signal input.

14. A system comprising:

a first clock domain having a first clock signal at a first clock rate;

a second clock domain having a second clock signal at a second clock rate, said second clock domain different than said first clock domain;

a network on which data vectors travel, said network disposed and operating in said first clock domain;

a memory mechanism for storing data vectors, said memory mechanism disposed and operating in said second clock domain; and a synchronizer for transferring data from the first clock domain having the first clock signal at the first clock rate to the second clock domain having the second clock signal at the second clock rate comprising: a mechanism for transferring data from the first clock domain to the second clock domain; a mechanism for synchronizing the transfer of data from the first clock domain to the second clock domain by the transferring mechanism, said synchronizing mechanism self-timing based only on the first clock rate and second clock rate without any additional control signals and at any frequency relationship between the first clock rate and second clock rate, said synchronizing mechanism connected with said transferring mechanism, said synchronizer connected with the first clock domain and the second clock domain to receive the first clock signal and the second clock signal wherein during continuous operation of the synchronizing mechanism, the first clock rate, being slower than the second clock rate, changes to a rate faster than the second clock rate or the first rate, being faster than the second clock rate, changes to a rate slower than the second clock rate.

15. A method for transferring data from a first clock domain having a first clock signal at a first clock rate to a second clock domain having a second clock signal at a second clock rate different from the first clock domain comprising the steps of:

receiving data at a first clock rate;

writing the data in holding registers at a first clock rate having leading edges;

synchronizing the data in the holding registers at the first clock rate with sampling registers at a second clock rate having leading edges based only on the leading edges of the first clock rate and the leading edges of the second clock rate without any additional control signals and at any frequency relationship between the first clock rate and second clock rate;

transferring the data from the holding registers at the first clock rate to the sampling registers at the second clock rate; and reading the data in the sampling registers at the second clock rate.

16. A method as described in claim 15 wherein the data includes N data vectors; the holding registers include N holding register elements, each one of the N holding register elements holding one of the N data vectors; and the synchronizing step includes the steps of producing an enable write signal, and transmitting the enable write signal to the N holding register elements; and the transferring step includes the step of transferring the N data vectors to the sampling registers all at once.

17. A method for transferring data from a first clock domain having a first clock signal having leading edges at a first clock rate to a second clock domain having a second clock signal having leading edges at a second clock rate different from the first clock domain comprising the steps of:

receiving data at the first clock rate;

writing the data in holding registers at a first clock rate;

synchronizing the data in the holding registers at the first clock rate with sampling registers at a second clock rate so there cannot ever be any overlap between when the data in the holding registers is transferred to the sampling registers and when the data is being written into the holding registers, said synchronizing step based only on the having leading edges of the first clock rate and the having leading edges of the second clock rate without any additional control signals and at any frequency relationship between the first clock rate and the second clock rate:

transferring the data from the holding registers at the first clock rate to the sampling registers at the second clock rate; and reading the data in the sampling registers at the second clock rate.

18. A method as described in claim 17 wherein the data includes N data vectors; the holding registers include N holding register elements, each one of the N holding register elements holding one of the N data vectors; and the synchronizing step includes the steps of producing an enable write signal, and transmitting the enable write signal to the N holding register elements; and the transferring step includes the step of transferring the N data vectors to the sampling registers all at once.

19. A synchronizer for transferring data from a first clock domain having a first clock signal at a first clock rate to a second clock domain having a second clock signal at a second clock rate different from the first clock domain comprising:

a mechanism for transferring data from the first clock domain to the second clock domain; and a mechanism for synchronizing the transfer of data from the first clock domain to the second clock domain by the transferring mechanism and only when the data to be transferred from the first clock domain is no longer changing so there is no overlap with the data to be transferred as it is received at the transferring mechanism, said synchronizing mechanism connected with said transferring mechanism, said synchronizing mechanism is selftiming based only on the first clock rate and second clock rate without any additional control signals and at any frequency relationship between the first clock rate and the second clock rate wherein during continuous operation of the synchronizing mechanism, the first clock rate, being slower than the second clock rate, changes to a rate faster than the second clock rate or the first rate, being faster than the second clock rate, changes to a rate slower than the second clock rate.

20. A system comprising:

a first clock domain having a first clock signal at a first rate;

a second clock domain having a second clock signal at a second rate, said second clock domain different than said first clock domain;

a network on which data vectors travel, said network disposed and operating in said first clock domain;

holding registers in which the data vectors from the data vectors are written, said holding registers disposed and operating to said first clock domain, said holding registers connected with said network;

sampling registers for storing data vectors, said sampling registers disposed and operating in said second clock domain and connected with the holding registers; and a synchronizer for transferring data from the first clock domain having the first clock signal at the first clock rate to the second clock domain having the second clock signal at the second clock rate comprising: a mechanism for transferring data from the first clock domain to the second clock domain; a mechanism for synchronizing the transfer of data from the first clock domain to the second clock domain by the transferring mechanism so there cannot ever be any overlap between when the data in the holding registers is transferred to the sampling registers and when the data is being written into the holding registers, said synchronizing mechanism connected with said transferring mechanism, said synchronizer connected with the first clock domain and the second clock domain to receive the first clock signal and the second clock signal, said synchronizer is self-timing based only on the first clock rate and second clock rate without any additional control signals and at any frequency relationship between the first clock rate and the second clock rate, wherein during continuous operation of the synchronizer, the first clock rate, being slower than the second clock rate, changes to a rate faster than the second clock rate or the first rate, being faster than the second clock rate, changes to a rate slower than the second clock rate.

21. A synchronizer for transferring data from a first clock domain having a first clock signal at a first clock rate to a second clock domain having a second clock signal at a second clock rate different from the first clock domain comprising:

a mechanism for transferring data from the first clock domain to the second clock domain, said transferring mechanism transfers N data vectors from the first clock domain to the second clock domain all N data vectors at once, where N is greater than or equal to 1 and is an integer; and a mechanism for synchronizing the transfer of data from the first clock domain to the second clock domain by the transferring mechanism, said synchronizing mechanism self-timing based only on the first clock rate and second clock rate without any additional control signals, said synchronizing mechanism connected with said transferring mechanism, said transferring mechanism is comprised of holding registers in which the N data vectors are written, said holding registers operating at the first clock rate in the first clock domain, said holding registers connected with the synchronizing mechanism; and sampling registers which receive the N data vectors and from which the N data vectors are read at the second clock rate in the second clock domain, said sampling registers connected with the synchronizing mechanism and the holding registers. Wherein the synchronizing mechanism includes a clock sync circuit which is self timing and produces an enable write signal which controls the holding registers and writing of the N data vectors in the holding registers; and an said clock sync circuit produces enable read signal which controls the sampling registers and transfer of the N data vectors from the holding registers to the sampling registers and reading of the N data vectors in the sampling registers.

22. A synchronizer as described in claim 21 wherein the holding registers include N holding register elements, one holding register element for each of the N data vectors, and wherein the sampling registers include N sampling register elements, one sampling register element for each of the N data vectors.

23. A synchronizer as described in claim 22 wherein the clock sync circuit has a write clock signal input for receiving the first clock signal of the first clock domain, and a read clock signal input for receiving the second clock signal of the second clock domain.

24. A synchronizer as described in claim 23 wherein the clock sync circuit produces the enable write signal and enable read signal such that the sampling registers only receive the N data vectors from the holding registers when the N data vectors in the holding registers are not changing for any frequency and for any phase relationship between the first clock rate and the second clock rate.

25. A synchronizer as described in claim 24 wherein the clock sync circuit comprises a closed-loop shift register for controlling the enable read signal and the enable write signal, said closed-loop shift register connected with the write clock signal input and the read clock signal input; a write edge detector which produces the enable write signal, said write edge detector connected to the closed loop shift register and to the N holding register elements; and a read edge detector which produces the enable read signal, said read edge detector connected to the N sampling register elements and the closed loop shift register.

26. A synchronizer as described in claim 25 wherein the closed-loop shift register is comprised of a first D flip-flop connected to the write clock signal input and the write edge detector; a second D flip-flop connected to the first D flip-flop, the write clock signal input and the write edge detector; a third D flip-flop connected to the second D flip-flop, the read clock signal input and the read edge detector; and a fourth D flip-flop connected to the third D flip-flop, the first D flip-flop, the read clock signal input and the read edge detector.

27. A synchronizer as described in claim 26 wherein the write edge detector is comprised of a first write AND gate connected to the first D flip-flop and the second D flip-flop, a second write AND gate connected to the first D flip-flop and the second D flip-flop; and a write OR gate connected to the first and second write AND gate and the holding register elements.

28. A synchronizer as described in claim 27 wherein the read edge detector is comprised of a first read AND gate connected to the third D flip-flop and the fourth D flip-flop; a second read AND gate connected to the third D flip-flop and the fourth D flip-flop, and a read OR gate connected to the first and second read AND gate and the sampling register elements.

29. A synchronizer as described in claim 25 wherein the closed-loop shift register is comprised of a first D flip-flop connected to the write clock signal input and the write edge detector; a second D flip-flop connected to the first D flip-flop, the write clock signal input and the write edge detector; a third D flip-flop connected to the second D flip-flop, the read clock signal input and the read edge detector; a fourth D flip-flop connected to the third D flip-flop, the read clock signal input and the read edge detector; a fifth D flip-flop connected to the write clock signal input, the fourth D flip-flop, and the first D flip-flop; and a sixth D flip-flop connected to the second D flip-flop, the third D flip-flop, and the read clock signal input.

* * * * *